United States Patent Office 2,881,093
Patented Apr. 7, 1959

2,881,093

METHOD FOR COATING PIPE WITH PLASTIC FROM SOLUTION

Charles K. Buell, Bartlesville, Okla., assignor to Phillips Petroleum Company, a corporation of Delaware No Drawing. Application February 12, 1958
Serial No. 714,711

9 Claims. (Cl. 117—94)

This invention relates to a pipe coating. In one of its aspects, this invention relates to a method for coating a pipe. In another aspect this invention relates to a method of applying a polyolefin coating on a pipe.

It is known in the art to apply coatings of various types to the outside of pipes to protect same from corrosive environments. Pipe laid even in the atmosphere or in soil is often subject to corrosive action of the environment. One suitable coating material is a polymer of 1-olefins. These polymer coatings are generally applied by first dissolving the polymer in a suitable solvent, applying the solution to the pipe surface and thereafter evaporating the solvent leaving the polymer coating. Such coating methods are somewhat hazardous in that the solvents are often flammable, toxic or both and certain precautions are required during the drying or evaporation step. Also such operations are costly in that considerable solvent is lost or elaborate solvent recovery equipment is required by the method of this invention, a coating is applied to the pipe and only a very small amount of solvent remains on the pipe.

An object of this invention is to provide a novel method of coating a pipe.

Another object of this invention is to provide a method of applying a polyolefin coating to a pipe.

Still other objects, features and advantages of this invention will be obvious to those skilled in the art having been given this disclosure.

According to this invention, a pipe section to be coated is immersed in a solution of 1-olefin polymer under conditions that the pipe surface temperature is outside the solubility temperature range of the polymer in the solvent thereby causing polymer to precipitate out of solution on the surface of said pipe.

The polymers to which this application is particularly directed are polymers of aliphatic 1-olefins, particularly mono-1-olefins of 2 to 8 carbon atoms per molecule and having no branching nearer the double bond than the 4-position. Such polymers can be prepared by any method known to the art such as the older and well known high pressure polymerization of such 1-olefins as ethylene as is disclosed by Fawcett et al. in U.S. Patent 2,153,553 or the high pressure method of Larcher et al. described in U.S. Patent 2,816,883. Preferably the polymer will be one prepared by one of the newer low pressure catalytic methods such as is described in the application of Hogan and Banks filed March 26, 1956, having Serial No. 573,877, now Patent No. 2,825,721.

According to the Hogan and Banks application, polymers are produced by polymerizing 1-olefins having a maximum chain length of 8 carbon atoms and no branching nearer the double bond than the 4-position by contacting with a solid catalyst containing, as an essential catalytic ingredient, chromium oxide associated with at least one porous oxide selected from the group consisting of silica, alumina, zirconia, and thoria. Liquid phase or vapor phase operation can be employed. A highly satisfactory method involves contacting the monomers in the presence of a hydrocarbon diluent, in liquid phase, with a suspended comminuted catalyst of the type described by Hogan and Banks. It is preferred that the chromium content of the catalyst be in the range 0.5 to 10 weight percent and that an appreciable proportion of the chromium be in the hexavalent state, e.g., 0.1 to 5 weight percent of the catalyst be hexavalent chromium. This catalyst is generally activated under non-reducing conditions, preferably by contact with an oxidizing gas such as air, at high temperatures, e.g. 700–1000° F. prior to use. By one method of operation, the polymerization is carried out in a solvent such as cylcohexane at a temperature above the solution temperature of the polymer being formed, e.g. 250–375° F. In a method described in the copending application of Leatherman and Detter, Serial No. 590,567, filed June 11, 1956, a process is described wherein the polymerization is carried out in a solvent such as pentane at a temperature below the solution temperature thereby forming polymer as discrete particles. In any case, the polymer is separated from diluent by filtration, flashing of solvent, steam distillation or the like. Polymers produced by such a process will ordinarily have a molecular weight in the range 35,000 to 100,000, a density in the range 0.95 to 0.97, e.g., approximately 0.96, and a crystallinity in the range 90 to 95 percent. The polymer ordinarily has a melting point of approximately 250–265° F. and a softening point of about 265° F. or higher. The difference between melting point and softening point is due to the difference in methods by which these values are obtained as is known by those skilled in the polymer art. Polymers produced by these processes have unsaturation which is preponderantly of the terminal vinyl and/or trans-internal structure. So-called "branched vinyl" unsaturation is substantially absent. These terms are more fully discussed in the cited Hogan and Banks application.

Another suitable, but non-equivalent, method of producing highly crystalline, high density polymers comprises contacting an olefin such as ethylene, propylene, 1-butene and the like with a catalyst such as a mixture of a compound represented by the formula $AlR_3$ wherein R is a saturated aliphatic, cycloaliphatic or aromatic hydrocarbon radical or hydrogen; and a second compound which is ordinarily a halogen compound of a metal such as titanium, zirconium, chromium or molybdenum. An example of such a catalyst is a mixture of triethyl-aluminum and titanium tetrachloride. A similar suitable catalyst comprises a mixture of a compound represented by the formula $R_mAlX_n$ wherein R is a hydrocarbon radical of the type previously described, X is a halogen and $m+n=3$, i.e., the valence of aluminum, and a metal compound such as titanium dioxide, tetraalkoxides of titanium and tetravalent titanium salts of organic carboxylic acids. An example of such a catalyst is a mixture of diethylaluminum chloride, ethyl aluminum dichloride and titanium tetrachloride. A similar type of catalyst mixture comprises a halide of a Group IV metal, e.g., titanium tetrachloride and a free metal, such as metallic sodium or metallic magnesium. The reaction with these catalysts is preferably carried out in the presence of a hydrocarbon diluent in liquid phase at a temperature in the range from room temperature up to 300° C. Polymers produced in the presence of these catalysts have molecular weights which can range from 10,000 to 200,000 or higher. They generally have crystallinities of the order 80 to 85 percent and densities of about 0.95.

Still another method of forming such polymers is to liquefy the 1-olefin and polymerize the olefin in liquid phase.

While 1-olefins polymerized by any of the methods known to the art can be employed in the process of this invention, I prefer to use a polyolefin of high crystallinity, i.e., 80 percent or higher, and density of 0.92 or higher.

The polyolefins particularly applicable to this invention are those normally solid polyolefins prepared by polymerizing a major amount, preferably at least 90 weight percent, of a 1-olefin of 2 to 8 carbon atoms having a sole ethylenic unsaturation and having no branching nearer the double bond than the 4-position and even more preferably the polymer is polyethylene or a copolymer of a major proportion of ethylene with one or more 1-olefins. Such polymers will be referred to herein as ethylene polymers. Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, 4,5-dimethylhexene, and the like. These olefins can be polymerized with each other or with other olefins such as 1,3-butadiene, butene-2 and the like.

Any solvent for these polymers can be employed although hydrocarbons are generally preferred. It is also preferred that a solvent be used which is liquid at the solubility temperature, however, pressure can be employed which will maintain the solvent in the liquid state at solubility temperatures. Frequently, the solvent used in polymerization will be employed and by so operating, it is not required that the polymer be first recovered as such. Solvents especially useful in polymerization of the 1-olefins are hydrocarbons and preferably paraffins including cycloparaffins. These diluents include paraffins and cycloparaffins having 3 to 12 carbon atoms per molecule. Any hydrocarbon which is relatively inert, non-deleterious, and liquid under the operating conditions of the process can be utilized. Diluents that have been used successfully in the polymerization reaction and are operable in this invention include n-butane, iso-butane, normal pentane, isopentane, isooctane (2,2,4-trimethyl pentane), cyclohexane and methylcyclohexane. Unsaturated aliphatic and cyclic hydrocarbons are, in general, not used in the polymerization reaction since they are likely to enter the polymerization reaction. Aromatic hydrocarbons are not ordinarily employed in the Hogan and Banks method, but are frequently employed with the organo-metal catalyst previously described. In any case any such hydrocarbon is operable in the instant invention. While hydrocarbons are frequently preferred, other solvents can be employed, e.g., halogenated solvents such as carbon tetrachloride (o, m and p), dichlorobenzene, monochlorobenzene, chloroform, dichloroethane, trichloroethane, tetrachloroethane and the like or other halogens of similar types. The hydrocarbon can also have other substitutions such as alkoxy and the like, or hydroxy such as phenol. Such solvents are readily determined by those skilled in the art.

One method of operation is to preheat or precool the surface of the pipe and thereafter immerse the pipe into a solution of the polymer. The pipe surface will have a temperature outside the solution temperature range of the polymer and the polymer solution temperature adjacent the pipe surface will be sufficiently changed to cause polymer to precipitate.

A preferred method of operation is to immerse the pipe in the solution and to circulate a fluid through the pipe which will maintain the pipe surface at a temperature wherein the polymer is not soluble in the solvent. The solvent adjacent the pipe surface will be heated or cooled to above or below the cloud point of the solution thereby causing polymer to precipitate out of solution onto the pipe surface. The solution must be kept at a temperature within a definite range which is defined by the upper and lower cloud points of the solution except adjacent the pipe surface. Since the operability of the invention is dependent upon causing the solution temperature near the pipe surface to be outside the range defined by the cloud points, it is readily apparent that the remainder of the solution is preferably maintained at a temperature close to the cloud point, e.g., within 1–50° F. of the cloud point.

The polymer concentration in the solution is not critical but will generally be in the range 1 to 10 weight percent preferably 2.5 to 6 weight percent. Concentrations much higher than about 10 percent are usually rather viscous and would limit the displacement rate of depleted solvent with fresh solution.

The exact upper and lower cloud points of a given polymer-solvent mixture depend on the physical characteristics of the solvent, e.g., solvent power, molecular weight, critical temperature, and other properties; concentration of polymer in solvent; and on certain properties of the polymer, molecular weight, composition and the like. Although it is substantially impossible to state a definite range of temperature which defines accurately the range between the upper and lower cloud points of all possible polymer-solvent mixtures, those skilled in the art will be able to determine the cloud point temperatures for any given mixture, upon consideration of the present disclosure.

The cloud point of any particular polymer-solvent mixture can readily be determined by those skilled in the art by mere routine test, which comprises heating the particular mixture to a temperature at which a single homogeneous liquid solution or phase, as detected by visual observation, is obtained and heating this solution at gradually increasing temperatures until cloudiness, which indicates the formation of a second phase, is detected. The temperature at which the cloudiness appears is the upper cloud point. The original solution is gradually cooled, and the temperature at which the appearances of a solid polymer phase, indicated by a cloudiness in the solution is determined; this temperature is the lower cloud point. When the solution being tested contains suspended catalyst, as will be the case in a polymerization effluent from an operation using solid catalyst and no filtration step, the precise detection of the cloud points is somewhat more difficult than when suspended catalyst is absent; however, they can be detected by visual observation even though suspended catalyst is present, and the detection is sufficiently accurate to enable one skilled in the art to practice the present invention. The accuracy of the determination can be increased in many cases by the use of an instrument, such as, for example, a nephelometer, a photometer, or any other instrument which measures the light absorption or the scattering effect produced by the precipitation of additional solid or liquid in a mixture. Such instruments are well known in the analytical and instrument control arts.

EXAMPLE I

The upper and lower cloud points of several mixtures of polyethylene and hydrocarbon solvent, with and without suspended catalyst, were determined by gradually heating until the transition temperature between a single homogeneous liquid phase and two phases was obtained and subsequently by gradually cooling until the transition temperature between a homogeneous liquid phase and a liquid phase in equilibrium with a solid polymer phase was visually detected.

The polymers were obtained by catalytically polymerizing ethylene, in solution in the solvent, at a temperature in the range 250 to 350° F., in the presence of a catalyst suspended in the form of a slurry in the reaction mixture. Sufficient pressure was maintained in the reaction zone to maintain the solution predominantly in the liquid phase. The catalyst was prepared by impregnating, with an aqueous solution of chromium nitrate, a steam-aged, coprecipitated gel composite comprising 90 weight percent silica and 10 weight percent alumina, drying the resulting composite and heating in a stream of substantially anhydrous air at approximately 950° F. for approximately 5 hours. The final catalyst had a total chromium content of approximately 2 weight percent, of which approximately half was in the form of hexavalent chromium. The tested mixtures which contained catalyst corresponded, in composition, to the effluent withdrawn from the reaction vessel.

The results obtained are shown in Table I.

Table I

| Run | Polymer concentration, weight percent | Catalyst concentration, weight percent | Solvent | Mol. weight polymer | Cloud point, °F. | |
|---|---|---|---|---|---|---|
| | | | | | Upper | Lower |
| 1 | Polymer+catalyst | 15-18 | i-C₈ | 40,000 | >340 | |
| 2 | 1.47 | 0.78 | i-C₈ | 43,000 | >330 | 214 |
| 3 | Polymer+catalyst | Ca. 15 weight percent | i-C₈ | 33,000 | >330 | <206 |
| 4 | 6.92 | 0.70 | i-C₈ | 33,000 | >390 | 198 |
| 5 | Not determined | Very dilute | i-C₈ | 33,000 | | 188 |
| 6 | 3.0 | 0 | i-C₈ | 40,000 | Ca. 370 | 188 |
| 7 | 5.2 | 0 | i-C₈ | 40,000 | Ca. 370 | 196 |
| 8 | 13.2 | 0.6 | i-C₈ | 47,000 | 320-350 | 202 |
| 9 | 2.0 | Trace | i-C₈ | 48,000 | 350-370 | 202 |
| 10 | 5.0 | do | i-C₈ | 48,000 | 378 | 202 |
| 11 | 10.0 | do | i-C₈ | 48,000 | 379 | 206 |
| 12 | 10.0 | do | CH | 48,000 | >400 | Ca. 175 |
| 13 | 5.0 | do | MCH | 48,000 | >400 | 181 |
| 14 | 5.0 | do | CH | 48,000 | >400 | 180 |
| 15 | 4.07 | do | CH | 39,000 | 450 | |
| 16 | 6.96 | do | CH | 39,000 | 470 | 175 | i-C₈, Commercial grade 2,2,4-trimethylpentane. Chief impurities are other isooctanes.
CH, 90 percent cyclohexane concentrate. Chief impurities are other close-boiling saturated hydrocarbons.
MCH, technical grade methylcyclohexane from Dow Chemical Co.
"Trace," 0.408 weight percent catalyst based upon polymer plus catalyst.

The following data were obtained by the use of a polyethylene having a molecular weight of about 47,000. This polyethylene was obtained by the method set forth supra, except that the reaction temperature was within the range 250 to 270° F. and the pressure was 500 p.s.i. Several isooctane solutions of the product polymer, having different concentrations, were examined for the visual determination of the upper and the lower cloud point. Results are shown in the following table.

Table II

| Polymer in solution, weight percent | Cloud point, °F. | |
|---|---|---|
| | Upper | Lower |
| 4.2 | 347 | 228 |
| 7.2 | 355 | 230 |
| 8.5 | 361 | 230 |
| 10.0 | 367 | 240 |

The foregoing data show the upper and lower cloud points of different concentrations of polyethylene in different hydrocarbon solvent.

The data also are representative of the cloud points of isooctane, cyclohexane, and methylcyclohexane solutions of polymers obtained under the conditions above indicated in the presence of a chromium oxide catalyst.

EXAMPLE II

To show how a pipe can be coated by the process of this invention, polyethylene as obtained in the second part of Example I is dissolved in cyclohexane at 420° F. as a 4.5 weight percent solution. A pipe section is cleaned of rust and surface dirt and is fitted with a flexible tubing at each end and the pipe submerged in the solution. An oil at 500° F. is circulated through the tubing and pipe for five minutes. The pipe is then removed and the solvent rapidly evaporated.

EXAMPLE III

In this example the same polymer solution is held at 200° F. and water is circulated through the pipe at 125° F. At 5 minutes the pipe is removed and dried.

In both of the above examples a plurality of pipe can be mounted in the solution, the pipe coated, the solution removed and the pressure on the chamber released, thereby evaporating solvent. In order to avoid a temperature gradient along the length of the pipe, the fluid should pass through the pipe rapidly thereby allowing only a slight temperature rise. In another embodiment a liquid having a suitable boiling point can be introduced into the pipe and allowed to boil along the length of the pipe. The solution is preferably stirred, however, this is not essential, the convection serving to bring solution to within close proximity of the pipe. Those skilled in the art will see many other modifications which can be made and still obtain the advantage of this invention.

I claim:

1. A process for applying a coating of a 1-olefin polymer to a pipe which comprises forming a solution of a normally solid 1-olefin polymer, said solution having an upper and a lower cloud point; maintaining the solution at a temperature intermediate said upper and lower cloud points; covering said pipe with said solution; maintaining the surface of said pipe at a temperature outside the range defined by said upper and lower cloud points, thereby causing the deposition of said polymer on said surface; and removing said pipe from the solution when coating of desired thickness has deposited thereon.

2. A process for coating a pipe surface with an olefin polymer which comprises forming a solution of a normally solid polymer prepared by polymerizing aliphatic olefin monomers comprising a major amount of 1-olefins having a sole unsaturation and no branching nearer the double bond than the 4-position; said solution having upper and lower cloud points; maintaining the solution at a temperature between the upper and lower cloud points; submerging the pipe to be coated in said solution; maintaining the temperature of the surface of said pipe outside the range defined by the upper and lower cloud points thereby causing polymer to precipitate from solution on said pipe and recovering the thus coated pipe.

3. The process of claim 2 wherein the monomers comprise at least 90 percent ethylene.

4. The process of claim 3 wherein the solvent is a hydrocarbon.

5. The process of claim 4 wherein the temperature of said solution is maintained within the range 1 to 50° F. of one of said cloud points.

6. The process of claim 5 wherein the temperature of said solution is maintained within the range 1 to 50° F. of the lower cloud point and the pipe surface is maintained below said lower cloud point.

7. The process of claim 5 wherein the temperature of said solution is maintained within the range 1 to 50° F. of the upper cloud point and the temperature of the pipe surface is maintained above the upper cloud point.

8. The process of claim 2 wherein the polymer is polyethylene.

9. The process of claim 8 wherein the polyethylene normally has a crystallinity of at least 80% and a density of at least 0.92.

No references cited.